(12) United States Patent
Furumura et al.

(10) Patent No.: US 8,766,802 B2
(45) Date of Patent: Jul. 1, 2014

(54) BASE DATA MANAGEMENT SYSTEM

(75) Inventors: Yuji Furumura, Yokohama (JP); Naomi Mura, Tokyo (JP); Shinji Nishihara, Tokyo (JP); Katsuhiro Fujino, Yokohama (JP); Katsuhiko Mishima, Yokohama (JP); Susumu Kamihashi, Yokohama (JP)

(73) Assignee: Philtech Inc., Tokyo (JP)

( * ) Notice: Subject to any disclaimer, the term of this patent is extended or adjusted under 35 U.S.C. 154(b) by 868 days.

(21) Appl. No.: 12/516,500

(22) PCT Filed: Nov. 26, 2007

(86) PCT No.: PCT/JP2007/072748
§ 371 (c)(1),
(2), (4) Date: May 27, 2009

(87) PCT Pub. No.: WO2008/065990
PCT Pub. Date: Jun. 5, 2008

(65) Prior Publication Data
US 2010/0060427 A1 Mar. 11, 2010

(30) Foreign Application Priority Data

Nov. 27, 2006 (JP) ................................. 2006-318532

(51) Int. Cl.
*G08B 13/14* (2006.01)

(52) U.S. Cl.
USPC ................... 340/572.4; 340/572.1; 340/572.7

(58) Field of Classification Search
USPC ............. 340/568.1, 568.7, 571, 572.1, 572.2, 340/572.4, 539.1, 10.1, 539.13, 572.8; 235/379, 380, 385, 449, 375; 343/787, 343/788; 428/403
See application file for complete search history.

(56) References Cited

U.S. PATENT DOCUMENTS 3,946,206 A * 3/1976 Darjany .............................. 360/2
4,058,839 A * 11/1977 Darjany .............................. 360/2
(Continued)

FOREIGN PATENT DOCUMENTS

JP 61-006783 1/1986
JP 63-112198 5/1988
(Continued)

OTHER PUBLICATIONS

International Preliminary Report on Patentability issued Jun. 3, 2009 for PCT/JP2007/072749 (English translation).

(Continued)

*Primary Examiner* — Van T. Trieu
(74) *Attorney, Agent, or Firm* — Foley & Lardner LLP

(57) ABSTRACT

A base data management system is provided which can grasp specific data recorded in a plate-like or sheet-like object having high property values, such as a variety of cards, paper money, and securities, in real time, and can manage and track circulating paper money or the like. The base data management system includes a base data reader including a reading mechanism that reads specific data or resonance frequency recorded in a base with a magnetic field coupling and a transmitting mechanism that transmits the specific frequency date read by the reading mechanism and reader information. The system also includes a host computer including a data receiving mechanism that receives the specific frequency date and reader information transmitted from the base data reader through a network, a storage device that stores the specific data and reader information received by the data receiving mechanism, and an output mechanism that processes the data stored in the storage device or compares the data with other data and thus outputs the data.

14 Claims, 8 Drawing Sheets

(56) References Cited

U.S. PATENT DOCUMENTS

| | | | |
|---|---|---|---|
| 4,745,401 A | 5/1988 | Montean | |
| 5,204,681 A | 4/1993 | Greene | |
| 5,291,205 A | 3/1994 | Greene | |
| 5,497,952 A | 3/1996 | Iding | |
| 5,518,937 A | 5/1996 | Furumura et al. | |
| 5,581,257 A | 12/1996 | Greene et al. | |
| 5,808,587 A | 9/1998 | Shima | |
| 6,072,394 A | 6/2000 | Hasegawa et al. | |
| 6,285,284 B1* | 9/2001 | Soe et al. | 340/572.1 |
| 6,445,271 B1 | 9/2002 | Johnson | |
| 6,479,384 B2 | 11/2002 | Komai et al. | |
| 6,642,827 B1 | 11/2003 | McWilliams et al. | |
| 6,758,397 B2* | 7/2004 | Catan | 235/385 |
| 6,966,488 B2* | 11/2005 | Yamagami | 235/380 |
| 6,998,696 B2 | 2/2006 | Casper et al. | |
| 7,061,083 B1 | 6/2006 | Usami et al. | |
| 7,102,522 B2 | 9/2006 | Kuhns | |
| 7,158,033 B2 | 1/2007 | Forster | |
| 7,227,504 B2 | 6/2007 | Deguchi et al. | |
| 7,288,320 B2* | 10/2007 | Steenblik et al. | 428/403 |
| 7,305,223 B2 | 12/2007 | Liu et al. | |
| 7,317,420 B2 | 1/2008 | Aisenbrey | |
| 7,405,665 B2 | 7/2008 | Yamazaki | |
| 7,427,577 B2* | 9/2008 | Tang et al. | 501/152 |
| 7,508,305 B2 | 3/2009 | Yamazaki et al. | |
| 7,551,054 B2 | 6/2009 | Mizuno et al. | |
| 7,557,757 B2 | 7/2009 | Deavours et al. | |
| 7,623,036 B2* | 11/2009 | Onderko et al. | 340/572.1 |
| 7,767,551 B2 | 8/2010 | Arita et al. | |
| 7,876,189 B2 | 1/2011 | Gilmartin et al. | |
| 7,893,837 B2 | 2/2011 | Yamazaki et al. | |
| 7,984,849 B2* | 7/2011 | Berghel et al. | 235/380 |
| 7,990,137 B2* | 8/2011 | Antoku | 324/210 |
| 2002/0163479 A1 | 11/2002 | Lin et al. | |
| 2003/0037240 A1 | 2/2003 | Yamagishi et al. | |
| 2003/0095032 A1 | 5/2003 | Hoshino et al. | |
| 2003/0136828 A1 | 7/2003 | Takesada et al. | |
| 2005/0194591 A1 | 9/2005 | Usami et al. | |
| 2006/0044111 A1* | 3/2006 | Kollar et al. | 340/10.1 |
| 2006/0044769 A1 | 3/2006 | Forster et al. | |
| 2006/0202269 A1 | 9/2006 | Suzuki et al. | |
| 2007/0138251 A1 | 6/2007 | Mattlin et al. | |
| 2007/0176622 A1 | 8/2007 | Yamazaki | |
| 2007/0210364 A1 | 9/2007 | Kato et al. | |
| 2008/0042168 A1 | 2/2008 | Watanabe et al. | |
| 2008/0130018 A1* | 6/2008 | Steenblik et al. | 356/625 |
| 2008/0303735 A1 | 12/2008 | Fujimoto et al. | |
| 2009/0206151 A1* | 8/2009 | Morita | 235/375 |
| 2010/0026441 A1 | 2/2010 | Wedley | |
| 2010/0066619 A1 | 3/2010 | Furumura et al. | |
| 2010/0067166 A1 | 3/2010 | Furumura et al. | |
| 2011/0063184 A1 | 3/2011 | Furumura et al. | |

FOREIGN PATENT DOCUMENTS

| | | |
|---|---|---|
| JP | 63-261851 | 10/1988 |
| JP | 03-087027 | 4/1991 |
| JP | 05-101249 | 4/1993 |
| JP | 06-350495 | 12/1994 |
| JP | 07-263935 | 10/1995 |
| JP | 08-022514 | 1/1996 |
| JP | 08-305970 | 11/1996 |
| JP | 10-069533 | 3/1998 |
| JP | 10-171951 | 6/1998 |
| JP | 11-328493 | 11/1999 |
| JP | 2000-269166 | 9/2000 |
| JP | 2001-230220 | 8/2001 |
| JP | 2002-271122 | 9/2002 |
| JP | 2002-333913 | 11/2002 |
| JP | 2003-058659 | 2/2003 |
| JP | 2003-087044 | 3/2003 |
| JP | 2003-157477 | 5/2003 |
| JP | 2003-179005 | 6/2003 |
| JP | 2003-187195 | 7/2003 |
| JP | 2003-216908 | 7/2003 |
| JP | 2003-242472 | 8/2003 |
| JP | 2004-079746 | 3/2004 |
| JP | 2004-139405 | 5/2004 |
| JP | 2004-159960 | 6/2004 |
| JP | 2005-020058 | 1/2005 |
| JP | 2005-050997 | 2/2005 |
| JP | 2005-183741 | 7/2005 |
| JP | 2005-197630 | 7/2005 |
| JP | 2005-208775 | 8/2005 |
| JP | 2005-216099 | 8/2005 |
| JP | 2005-284333 | 10/2005 |
| JP | 2005-285109 | 10/2005 |
| JP | 2005-340658 | 12/2005 |
| JP | 2005-340791 | 12/2005 |
| JP | 2006-012086 | 1/2006 |
| JP | 2006-027745 | 2/2006 |
| JP | 2006-041986 | 2/2006 |
| JP | 2006-066899 | 3/2006 |
| JP | 2006-180043 | 7/2006 |
| JP | 2006-203852 | 8/2006 |
| JP | 2006-277667 | 10/2006 |
| JP | 2006-285958 | 10/2006 |
| WO | WO-2008/099955 | 8/2008 |

OTHER PUBLICATIONS

International Preliminary Report on Patentability issued Jun. 3, 2009 for PCT/JP2007/072750 (English translation).

International Preliminary Report on Patentability issued Jun. 3, 2009 for PCT/JP2007/072751 (English Translation).

International Preliminary Report on Patentability issued Jun. 3, 2009 for PCT/JP2007/072752 (English translation).

International Preliminary Report on Patentability issued Jun. 3, 2009 for PCT/JP2007/072746 (English Translation).

International Search Report mailed Feb. 19, 2008 for PCT/JP2007/072746 (English translation).

International Preliminary Report on Patentability issued Jul. 9, 2009 for PCT/JP2007/074108 (English translation).

Usami, Mitsuo, An ultrasmall RFID chip:m-chip, Oyo Buturi, vol. 73, No. 9, pp. 1179-1183 (2004).

Usami, Mitsuo, et al., Ubiquitous Technology IC Tag, first edition, Ohmsha, Ltd., pp. 115, Mar. 15, 2005.

Non-Final Office Action for U.S. Appl. No. 12/521,244, mailed on Nov. 8, 2011, 11 pp.

Notice of Allowance for U.S Appl. No. 12/516,493, mailed on Oct. 17, 2011, 14 pp.

Non-Final Office Action for U.S. Appl. No. 12/516,497, mailed on Nov. 21, 2011, 10 pp.

"RFID 'Powder'—World's Smallest RFID Tag," Hitachi, Technovelgy LLC, Feb. 14, 2007, http://www.technovelgy.com/ct/Science-Fiction-News.asp?NewsNum=939"", 3 pp.

International Preliminary Report on Patentability for PCT/JP2007/072747, mailed Jun. 11, 2009 (English Translation).

International Preliminary Report on Patentability for PCT/JP2007/072748, mailed Jun. 11, 2009 (English Translation).

International Search Report and Written Opinion for PCT/JP2007/072747, mailed Jan. 29, 2008 (English Translation).

International Search Report and Written Opinion for PCT/JP2007/072748, mailed Feb. 19, 2008 (English Translation).

International Search Report and Written Opinion for PCT/JP2007/072749 mailed Feb. 19, 2008 (English Translation).

International Search Report and Written Opinion for PCT/JP2007/072750, mailed Feb. 26, 2008 (English Translation).

International Search Report and Written Opinion for PCT/JP2007/072751, mailed Feb. 5, 2008 (English Translation).

International Search Report and Written Opinion for PCT/JP2007/072752, mailed Feb. 12, 2008 (English Translation).

Junko Yoshida, "Euro bank notes to embed RFID chips by 2005," EETimes News and Analysis, Dec. 19, 2001, http://www.eetimes.com/story/OEG20011219S0016, 3 pp.

Li Yang et al., "Design and Development of Novel Miniaturized UHF RFID Tags on Ultra-low-cost Paper-based Substrates," Proceedings of Asia-Pacific Microwave Conference 2006, vol. 12, Issue 15, Dec. 2006, pp. 1493-1496.

(56) References Cited

OTHER PUBLICATIONS

N Mura et al., "RF-Powder : Fabrication of 0.15-mm Si-powder Resonating at Microwave Frequencies," IEEE European Microwave Conference, 2007, vol. 9 , Issue 12, Oct. 2007, pp. 392-395.
Non-Final Office Action for U.S. Appl. No. 12/516,643, mailed on Jan. 12, 2012.
Notice of Allowance for U.S. Appl. No. 12/516,493, mailed on Jan. 20, 2012.
Notice of Allowance for U.S. Appl. No. 12/521,244, mailed on Jan. 26, 2012.
Restriction Requirement for U.S. Appl. No. 12/516,705, mailed on Dec. 12, 2011.
Tetsuo Nozawa, "Hitachi Achieves 0.05-mm Square Super Micro RFID Tag, 'Further Size Reductions in Mind'," Tech-On Nikkei Business Publications, Feb. 20, 2007, http://techon.nikkeibp.com.jp/english/NEWS_EN/20070220/127959/, 2 pp.
Tim Hornyak, "RFID Powder," Scientific American, Inc., Feb. 2008, pp. 68-71.
W Choi et al., "RFID Tag Antenna with a Meandered Dipole and Inductively Coupled Feed," IEEE Antennas and Propagation Society International Symposium 2006, vol. 9, Issue 14, Jul. 2006, pp. 619-622.
Winston Chai, "Euro notes to get RFID tags from Hitachi?," CBS Interactive Limited, May 23, 2003, http://networks.silicon.com/mobile/0,39024665,10004316,00.htm, 8 pp.
Hitachi Pamphlet, World's smallest and thinnest 0.15 × 0.15 mm, 7.51-Im thick RFID IC chip, Feb. 6, 2006, http://www.hitachi.com/New/cnews/060206.html, 3 pages.
Non-final Office Action received for U.S. Appl. No. 12/516,705 dated Mar. 19, 2012.
Notice of Allowance received for U.S. Appl. No. 12/516,493 dated Feb. 23, 2012.
Notice of Allowance for U.S. Appl. No. 12/521,244, mailed on Mar. 29, 2012.
Final Office Action issued for U.S. Appl. No. 12/516,643, mailed on Aug. 17, 2012, 14 pp.
Notice of Allowance for U.S. Appl. No. 12/516,705, mailed on Jul. 18, 2012, 9 pp.
Final Office Action issued for U.S. Appl. No. 12/516,497, mailed on Jun. 5, 2012.
Non-Final Office Action for U.S. Appl. No. 12/516,643, mailed on Jun. 12, 2013, 15 pp.
Non-Final Office Action issued for U.S. Appl. No. 12/516,648, mailed on May 31, 2013, 29 pp.
Non-final Office Action received for U.S. Appl. No. 12/516,715 dated Sep. 16, 2013.

* cited by examiner

BASE DATA MANAGEMENT SYSTEM

CROSS-REFERENCE TO RELATED APPLICATIONS

The present application is a U.S. national stage application claiming the benefit of International Application No. PCT/JP2007/072748, filed Nov. 26, 2007, which claims the benefit of Japanese Patent Application No. 2006-318532, filed Nov. 27, 2006, the entire contents of which are incorporated herein by reference in their entireties.

TECHNICAL FIELD

The present invention relates to base data management systems, and particularly to a base data management system that reads, stores, and manages specific data of a base including an RF powder, and that is suitable to track a circulating base, such as paper money.

BACKGROUND

The IC tag is considered to be a product positioned at the entrance to the ubiquitous age. Name tags, Suica cards, Fe RAM cards, and the like have been developed for RF-ID (microminiaturized radio frequency identification). Many people expect that the IC tag market must grow greatly. However, the IC tag market has not yet grown more than expected. This is because there are social problems that should be overcome, such as price, security, and confidentiality.

It is also expected that the RF-ID technology is applied to the identification of written property, such as paper money and securities. Since the problem of counterfeit bills becomes significant, an IC tag may be embedded in paper money to solve such a problem. However, IC tags are expensive and large. It is therefore difficult to embed an IC tag.

The price of IC tags can be reduced by miniaturizing IC tag chips. The miniaturization of IC tag chips results in an increased number of tag chips produced from a single wafer. So far a 0.4 mm square IC tag chip has been developed. This IC tag chip can store 128-bit memory data that can be read by microwaves of 2.45 GHz (see, for example, Non-patent Document 1).

A paper sheet data management system is disclosed for tracking the source of a counterfeit bill or persons who use the counterfeit bill (for example, Patent Document 1). The system reads and stores specific data recorded for each paper money, and tracks the source data of the counterfeit bill and manages the data. In this paper sheet data management system, when a paper money in which specific data has been recorded is returned from a reader after the reader reads and stores the specific data, the recorded specific data is transferred to the place where the paper money is transferred.

Patent Document 1: Japanese Unexamined Patent Application Publication No. 11-328493

Non-patent Document 1: Mitsuo USAMI "An ultrasmall RFID chip: μ-chip", OYO BUTSURI, Vol. 73, No. 9, 2004, pp. 1179-1183

In the data management system disclosed in Patent Document 1, when a paper money is returned from the reader, the specific data is transferred with the paper money. It cannot be found that a counterfeit bill has been used, until the data is transferred to the place where the paper money is returned. Thus, the specific data of the paper money cannot be grasped or managed in real time immediately after the specific data has been read. It is difficult for the manager to grasp the use of a counterfeit bill immediately.

BRIEF SUMMARY OF THE INVENTION

Accordingly, an object of the present invention is to provide a base data management system that can grasp specific data recorded in a plate-like or sheet-like object having high property values, such as a variety of cards, paper money, and securities, in real time, and can manage and track circulating paper money or the like.

In order to accomplish the object of the invention, a base data management system according to the present invention is configured as below.

The base data management system includes a base data reader including reading means that reads specific data of particles fixed to a base and transmitting means that transmits the specific data read by the reading means and reader information. The system also includes a computer including data receiving means that receives the specific data and reader information transmitted from the base data reader through a network, storage means that stores the specific data and reader information received by the data receiving means, and output means that processes the data stored in the storage means according to the application and outputs the processed data.

In this structure, the base includes an RF powder. The RF powder contains RF powder particles, each having an antenna circuit element responding to an external high frequency electromagnetic field.

In the above structure, preferably, the base is made of paper or a plastic. More preferably, the base is paper money.

In the above structure, preferably, the specific data is a frequency data given by the antenna circuit elements in the RF powder particles.

In the above structure, preferably, the reader information include an ID and positional information of the base data reader and read date and time information.

The system according to the present invention includes a base data reader that reads specific data of a base and transmits the specific data and reader information, and a computer that receives and stores the specific data and reader information transmitted from the base data reader through a network, and outputs the data and information as required. Therefore, the system can grasp and manage specific data given from a plate-like or sheet-like object having high property values, such as a variety of cards, paper money, and securities, in real time. Consequently, managers can track circulating paper money or the like, and if a counterfeit bill or the like is used, they can rapidly know the fact.

DETAILED DESCRIPTION

Embodiments (examples) of the present invention will now be described with reference to attached drawings.

Figure 1:
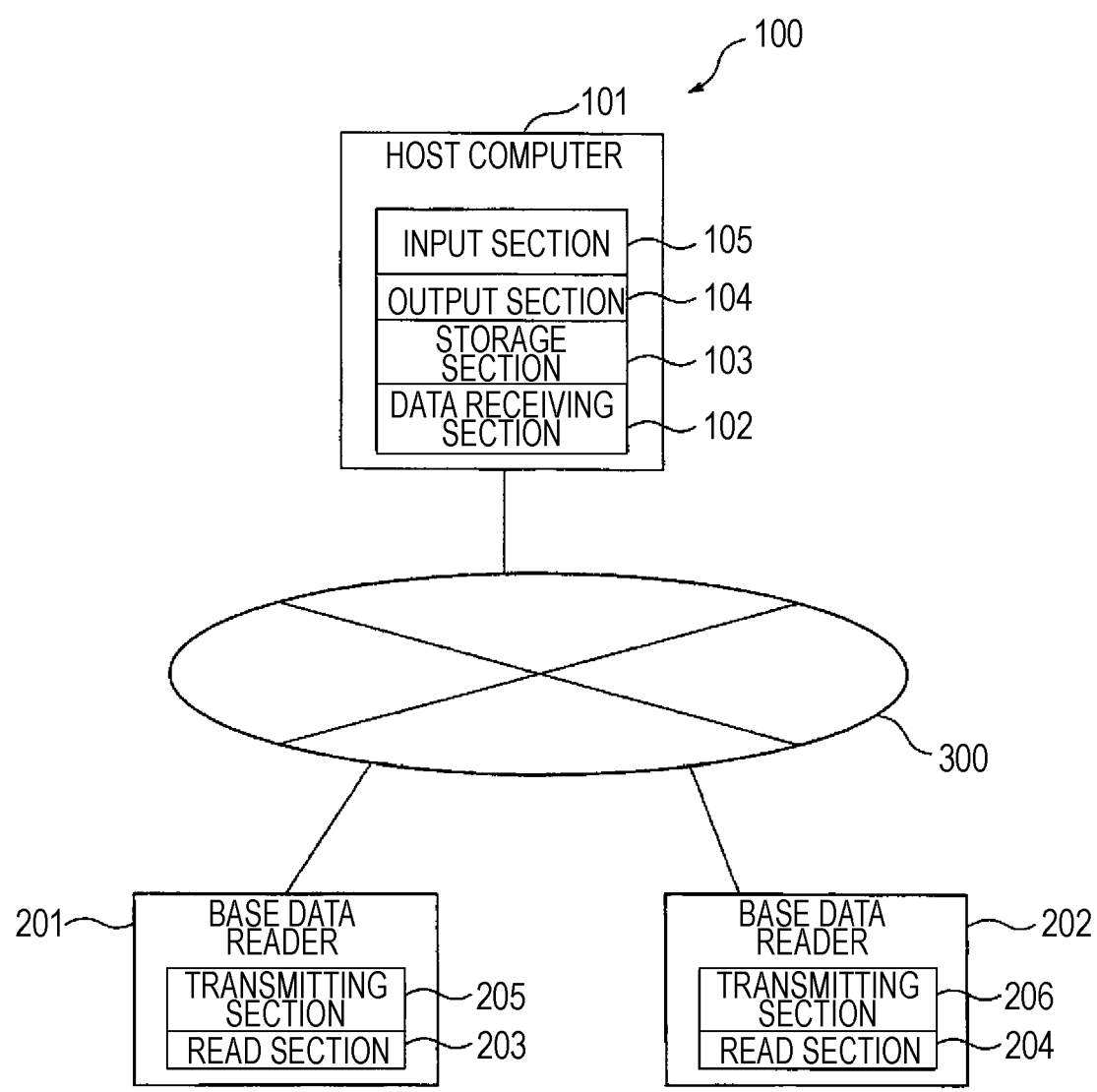
FIG. 1 is a system representation of the overall structure of a base data management system according to an embodiment of the present invention.

FIG. 1 is a representation of the overall structure of a base data management system according to an embodiment of the present invention. As shown in FIG. 1, the base data management system 100 includes, for example, a host computer 101 (generally a computer 101) and, for example, two base data readers 201 and 202 connected to each other through a network 300. Although the number of base data readers is two in the embodiment shown in FIG. 1, many base data readers are provided in desired positions and connected to the network 300 in practice. The network 300 is typically the internet.

The base data readers 201 and 202 each include a read section 203 or 204 that reads specific data recorded to a sheet-like base, such as paper money, and a transmitting section 205 or 206 that transmits the specific data read by the read section 203 or 204 and reader information. The specific data mentioned herein include information provided by each of a large number of RF powder particles contained in the RF powder (specific data such as frequency data) and positional data of the RF powder particles in or on the base, as will be described below. The reader information includes IDs and positional information of the base data readers 203 and 204 and read date and time information.

The base data readers 201 and 202 may simply function as terminal devices of the base data management system 100, or independent computers (PCs) connected to a network for data communication as well as functioning as terminals. The host computer 101 includes a data receiving section 102 that receives the specific data and reader information transmitted from the base data readers 201 and 202 through the network 300, a storage section 103 that stores the specific data and reader information received by the data receiving section 102, and an output section 104 that outputs the data stored in the storage section 103. The output section 104 may be a display screen or a printer. The host computer 101 further includes an input section 105 that inputs instructions for searching the information stored in the storage section 103 and for outputting a raw or processed search result from the output section 104.

In the base data management system 100, for example, the base data reader 201 reads paper money. Consequently, the read section 203 reads the specific data recorded on or in the base, such as paper money, and the specific data and reader information including ID, positional information, and read date and time information are transmitted to the host computer 101. In the host computer 101, the data receiving section 102 receives the transmitted specific data and reader information and the storage section 103 stores the specific data and device information. The output section 104 displays, if necessary, the stored specific data and device information on a display screen, or outputs them from a printer. Consequently, it can be known in real time when or where the base, such as paper money, is read and which device reads the base. In addition, it can be known from the specific data whether the paper money is counterfeit or not. Furthermore, by designating a specific data of the base of a specific paper money to search the specific data and device information stored in the storage section 103 of the host computer 101 and to compare the data and information with other necessary data, the route of the circulation of the paper money can be tracked. Thus, the bases of, for example, paper money can be easily and accurately managed by a central control office.

Although two base data readers are used in the present embodiment, the number of base data readers is not limited to two, and two or more base data readers may of course constitute a similar system.

Figure 2:
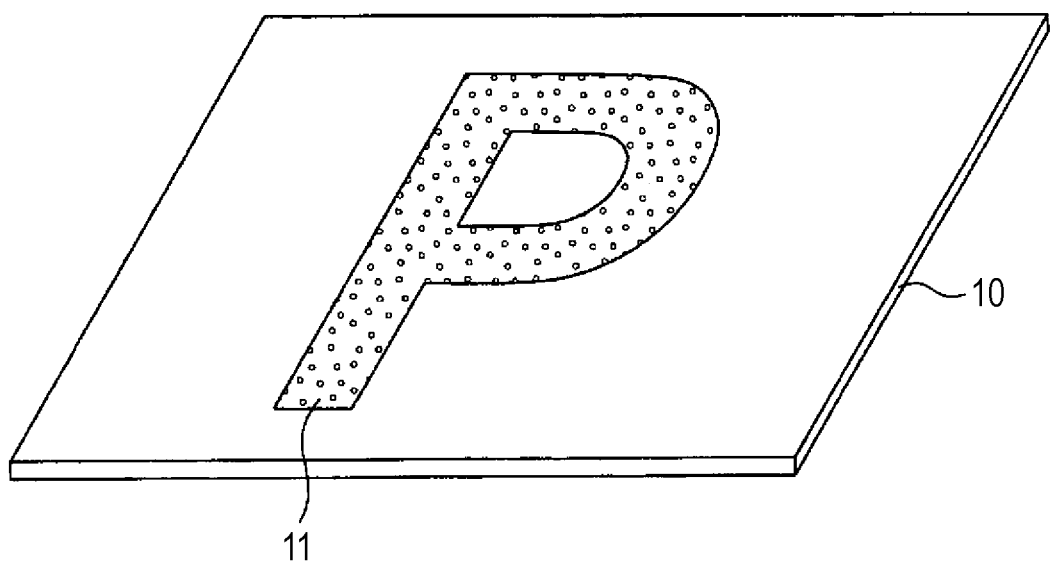
FIG. 2 is a perspective view of an RF powder-containing base according to an embodiment.

The base, such as paper money, used in the base data management system will now be described with reference to FIG. 2. FIG. 2 is a perspective view of a base including an RF powder used in the base data management system. FIG. 2 is enlarged, and shows a state in which, for example, a single type of a large number of RF powder particles 11 are disposed on a surface of a paper base 10 by printing or the like. In this instance, the base 10 is a paper money, for example. The RF powder particles 11 are disposed so as to write a letter or a numeral on a surface together with a colored print ink. In FIG. 2, a letter "P" is written. The RF powder particles 11 respond to a high frequency electromagnetic field having a single frequency.

The large number of RF powder particles 11 are collectively treated as a powder in practice, hence constituting the RF powder. The RF powder particles 11 are dispersed on the surface of the sheet-like base 10 so as to write a letter "P". The base 10 including a large number of RF powder particles on the surface or inside is hereinafter referred to as an "RF powder-containing base 10".

The "RF powder" refers to a powder constituted of a large number of particles, each having an electrical circuit element that transmits and receives signals to or from external readers (read sections 203 and 204) by radio (in a high frequency electromagnetic field). The particles are generally treated as a powder collectively.

The concrete structure of one of the large number of RF powder particles (11) will now be described as an RF powder particle 21 with reference to FIGS. 3 to 5.

Figure 3:
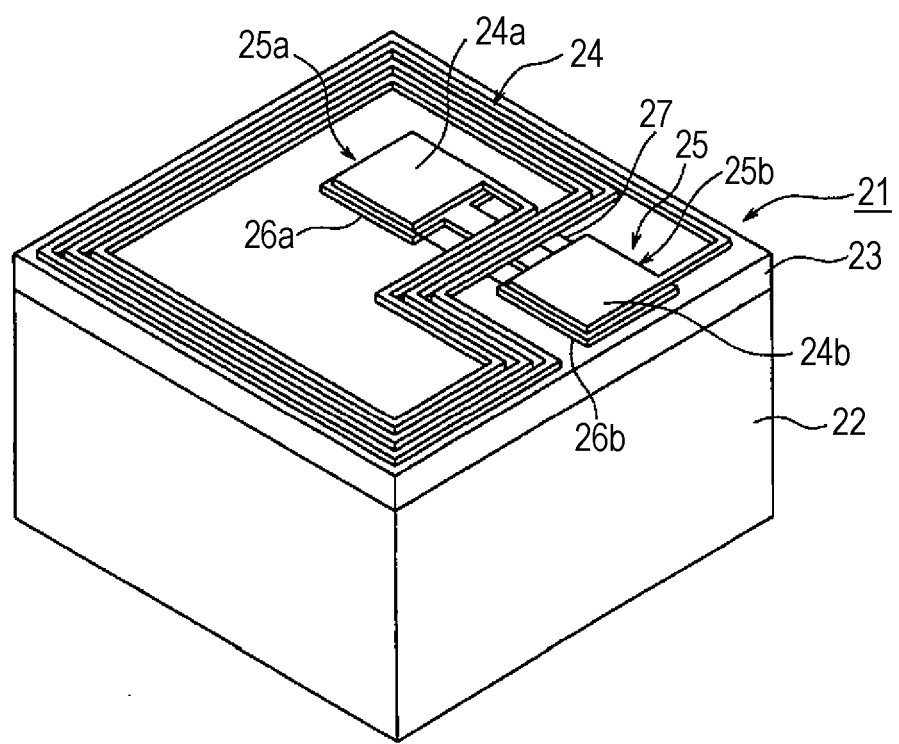
FIG. 3 is a perspective view of a single RF powder particle disposed on a surface of an RF powder-containing base.
Figure 4:
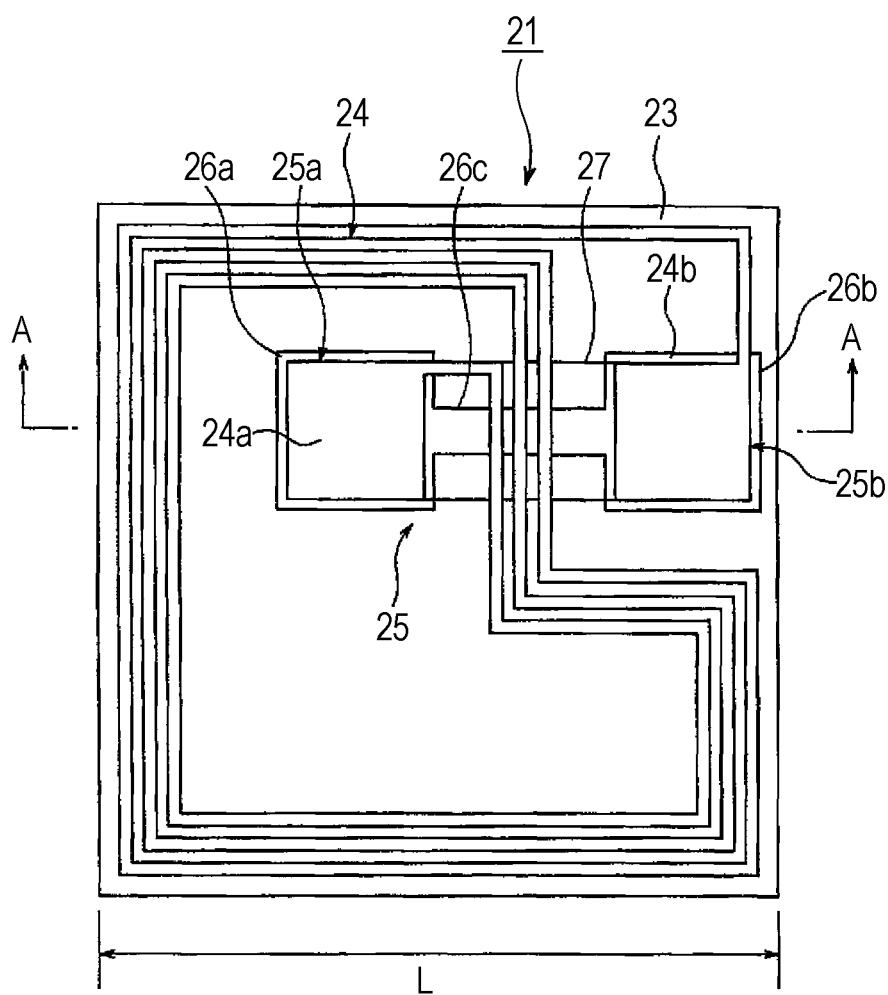
FIG. 4 is a plan view of the RF powder particle.

FIG. 3 is an external perspective view of an RF powder particle; FIG. 4 is a plan view of the RF powder particle; and FIG. 5 is a sectional view taken along line A-A in FIG. 4. The thickness of the RF powder particle shown in the profile of FIG. 5 is exaggerated.

The RF powder particle 21 shown in FIG. 3 is preferably in a cubic shape or a similar platy rectangular parallelepiped shape. A plurality of rectangular planes defining the external surface of the RF powder particle have such three-dimensional shapes as the rectangular plane having the longest side measures 0.30 mm squares or less, and more preferably 0.15 mm squares or less. The RF powder particle 21 of the present embodiment has a square shape in plan view as shown in FIG. 4. The RF powder particle 21 in a square shape shown in FIG. 4 has sides, each having a length L of, for example, 0.15 mm (150 μm).

In the RF powder particle 21, an insulating layer 23 ($SiO_2$ or the like) is formed on, for example, a silicon (Si) substrate 22, and a plural-turn coil 24 (inductance element) and a capacitor 25 (capacitance element) are formed on the insulating layer 23 by a film-forming technique. The insulating layer 23 has a thickness of, for example, about 10 μm. The capacitor 25 includes two portions 25a and 25b.

The coil 24 and the capacitor 25 formed on the insulating layer 23 are coupled with a high frequency magnetic field having a specific frequency (for example, 2.45 GHz) and resonate. As shown in FIGS. 3 and 4, the coil 24 is defined by, for example, three turns of a single conductor wire running along the four sides of the square in plan view of the RF powder particle 21. The conductor wire of the coil 24 is made of, for example, copper (Cu). The coil 24 has square pads 24a and 24b having a predetermined area at both ends. The two pads 24a and 24b are located in an inner region and an outer region with the intersections of the coil 24 therebetween. The two pads 24a and 24b are connected to each other in the direction perpendicular to the intersections of the coil 24. The pads 24a and 24b function as upper electrodes of the two portions 25a and 25b of the capacitor 25, respectively.

In the above structure, the number of turns and the length of the coil 24 can arbitrarily set to obtain an intended resonance frequency. The shape of the coil 24 may also be changed. The pad electrodes of the capacitor, and the dielectric material disposed between the pad electrodes and its thickness can also be appropriately designed according to an intended frequency.

The capacitor 25 of the present embodiment includes, for example, two capacitor elements 25a and 25b. The capacitor element 25a includes the upper electrode 24a and a lower electrode 26a (aluminum (Al) or the like) separated by an insulating layer 27 ($SiO_2$ or the like). The lower electrode 26a has substantially the same shape as the upper electrode 24a. The upper electrode 24a and the lower electrode 26a are electrically isolated from each other by the insulating layer 27. The capacitor element 25b also includes the upper electrode 24b and a lower electrode 26b separated by the insulating layer 27. The lower electrode 26b has substantially the same shape as the upper electrode 24b, and the upper electrode 24b and the lower electrode 26b are electrically isolated from each other by the insulating layer 27 as in the above case.

The respective lower electrodes 26a and 26b of the capacitor elements 25a and 25b are connected to each other with a conductor wire 26c. The two lower electrodes 26a and 26b and the conductor wire 26c are formed in one body in practice. The insulating layer 27 of the capacitor elements 25a and 25b is formed as a single common layer. The insulating layer 27 has a thickness of, for example, 30 nm. The insulating layer 27 electrically isolates the conductor wire 26c connecting the lower electrodes 26a and 26b from the coil 24 in the region between the two capacitor elements 25a and 25b.

According to the structure described above, the capacitor 25 including the two capacitor elements 25a and 25b electrically connected in series is connected between both ends of the coil 24. A tank circuit (LC resonant circuit) is defined by the coil 24 and the capacitor 25 that are connected so as to form a loop. The tank circuit responds to a high frequency electromagnetic field having a frequency equal to the resonance frequency of the tank circuit.

Figure 5:
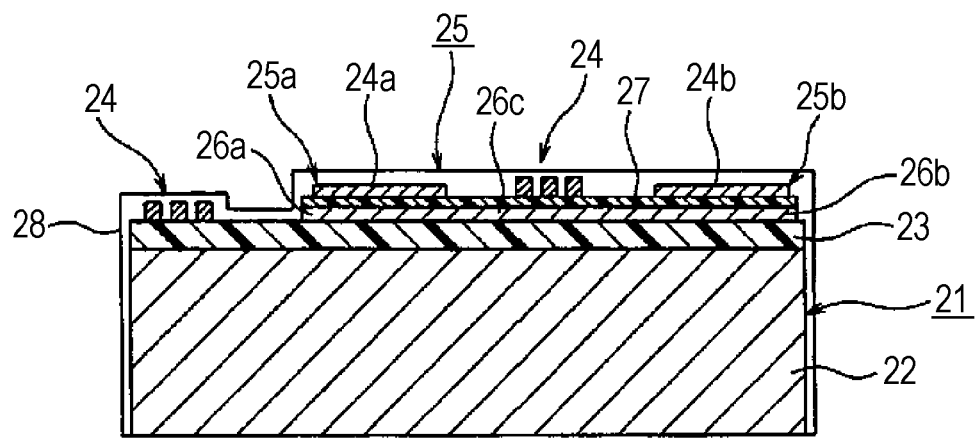
FIG. 5 is a sectional view taken along line A-A in FIG. 4.

As is clear from FIG. 5, the entire surface of the RF powder particle 21 is covered with a P—SiN film 28. The P—SiN film 28 protects the surface of the RF powder particle 21 having the tank circuit.

Although the capacitor 25 includes the two capacitor elements 25a and 25b, it is not limited to this structure and may be constituted of either of the capacitor elements. The capacitance of the capacitor 25 can be appropriately set according to the intended frequency by adjusting the area of the electrode and the dielectric material and its thickness. It may be set by disposing a plurality of capacitors in parallel.

Since the thus structured RF powder particle 21 includes the tank circuit including the plural-turn coil 24 and the capacitor 25 that are connected in a loop manner on the insulated surface of the substrate 22, the RF powder particle 21 can be arbitrarily designed with a given size so as to obtain an intended frequency. The RF powder particle 21 responds to only a high frequency electromagnetic field depending on the resonance frequency of the tank circuit. Thus, the RF power particle 21 functions as a "powder circuit element" that is coupled with a magnetic field of a designed frequency to resonate.

The coil 24 and the capacitor 25 formed on the insulating layer 23 are not electrically connected to the surface of the substrate 22 with a conductor. More specifically, a contact hole is not formed in the insulating layer 23 formed on the substrate 22, and hence, conductor wiring is not formed. The tank circuit including the coil 24 and the capacitor 25 is electrically isolated from the silicon substrate 22. The tank circuit including the coil 24 and the capacitor 25 functions as a resonant circuit by itself, isolated from the substrate 22.

The substrate 22 as a base of the RF powder particle 21 is made of silicon, and is provided with the insulating layer 23 over the surface thereof. As an alternative to the silicon substrate, a substrate made of a dielectric (insulative) material, such as glass, a resin, or a plastic, may be used. If a glass substrate or the like is used, the insulating layer 23 is not necessary because the material of such a substrate is intrinsically insulative (dielectric).

The RF powder particle 21 is not limited to the shape and structure shown in FIG. 3, and may be arbitrarily modified.

It will now be described with reference to FIGS. 6 to 8 how an RF powder-containing base 10 according to an embodiment of the present invention is used in practice and how the RF powder-containing base 10 functions. In an application to the base 10, for example, the above-described base data reader 201 reads a specific data. The base data reader 202 has the same structure and function as the base data reader 201, and the description thereof will be omitted.

As described with reference to FIG. 2, the sheet-like base 10, such as money paper, has a quite number of RF powder particles (11) at the surface thereof. The thickness of the base 10 shown in FIG. 6 is exaggerated. For adding the RF powder particles 11 to the base 10, a letter is written on the surface of the base 10 with an aqueous solution (ink or paint) containing an adhesive and the RF powder. Thus, a large number of RF powder particles 11 adhere to, for example, a surface of the base 10. The RF powder particles may be fixed inside when the paper is produced.

The base 10 is scanned by a reader 32 connected to a computer 31. The computer 31 reads frequency dependence data of the response of the RF powder particles 11 thereinto. The computer 31 includes a body 31b processing the data, a display device 31a, and a key board 31c for operation. The computer 31 acts as the base data reader 201.

Figure 7:
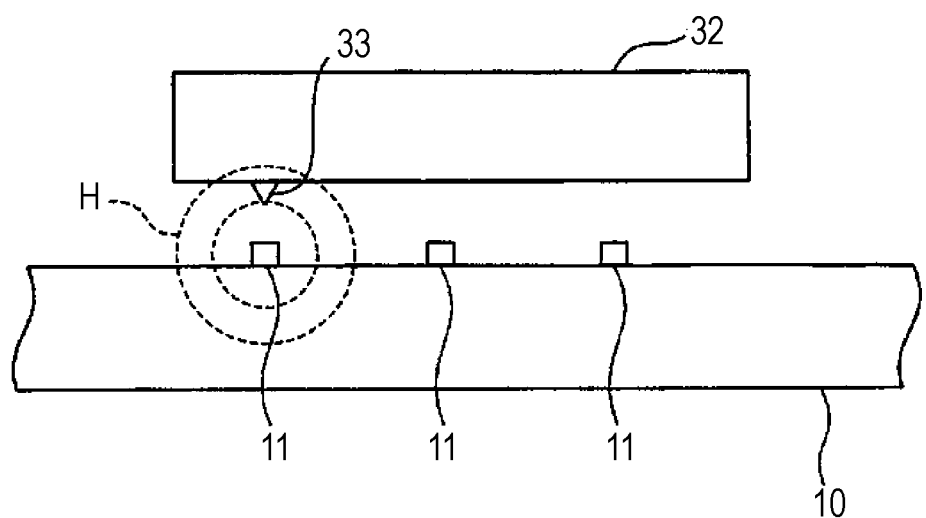
FIG. 7 is a schematic representation of signal exchanges between a reader and an RF powder-containing base.
Figure 8:
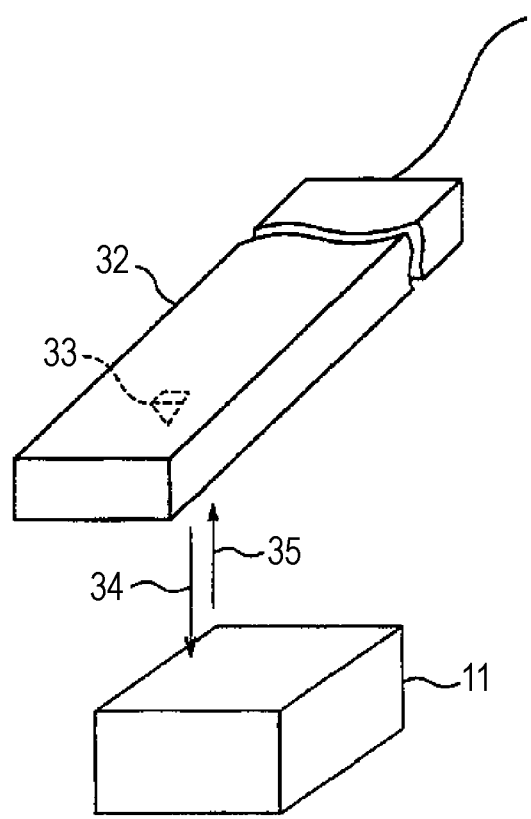
FIG. 8 is representation of transmission/reception of a high frequency electromagnetic field between a single RF powder particle and a reader in a region where the RF powder particle is present.

The reader 32 includes a reading probe 33 (see FIGS. 7 and 8). The reading probe 33 produces a high frequency electromagnetic field in the vicinity thereof and is coupled with the RF powder (RF powder particles 11 to 13) by magnetic field coupling. A powder particle having a natural frequency of, for example, 2.45 GHz resonates in a high frequency electromagnetic field having a frequency of the same 2.45 GHz and an electromagnetic energy is transmitted to the RF powder particle. In order to efficiently transmit the electromagnetic energy, it is required that the coil of the RF powder particle be present so close to the electromagnetic field generated by the reading probe 33 that they can be sufficiently coupled with each other. In order to establish an efficient coupling in a space, it is preferable that their respective coils have substantially the same size and be apart from each other with a distance substantially equal to the size of the coils. The presence of resonance can be checked by measuring reflectance because if a loss of energy transmitted to a circuit occurs and the energy is not returned from the circuit, the reflectance is reduced. In order to detect the natural oscillation frequency of 2.45 GHz of the RF powder particle, the frequency of the reading probe 33 is varied in the range of 1 to 3 GHz. The reader 32 scans over the surface of the base 10 with a specific distance kept so that a magnetic coupling can be established to determine the position of the powder.

FIG. 7 schematically shows a state in which when a high frequency field having a specific frequency is generated from the reading probe 33 of the reader 32, a resonance current flows to the coil of the tank circuit of the RF powder particle 11 having a natural oscillation frequency equal to or close to the specific frequency and an electromagnetic field H around the RF powder particle 11 is generated. This state may be expressed as response in the description of the present embodiment. Emission of electromagnetic waves can be neglected because the RF powder particle is quite shorter (0.15 mm) than wavelengths (for example, 15 cm in a 2 GHz-band). The transmission, reflection, and loss of the high frequency energy from the reading probe 33 are performed with a magnetic field coupling.

FIG. 8 shows a state in which an RF powder particle 11 is magnetically coupled to transmit and reflect an energy, in the region where it is present. The reader 32 is moved to scan, so that the reading probe 33 is located over the RF powder particle 11. The reading probe 33 generates a high frequency magnetic field therearound while the frequency is varied in a predetermined range. When the frequency becomes close to or equal to the natural oscillation frequency of the RF powder particle 11, a current flows in the tank circuit of the RF powder particle 11 including the coil and the capacitor through the magnetic field coupling at the same frequency. Thus, energy is transmitted (indicated by an arrow 34 shown in FIG. 8). The current consumes part of the transmitted (or received) energy as heat in the circuit. Thus, the heat is an energy loss component. The energy loss component can be measured as the decrease of the reflection component (indicated by arrow 35 in FIG. 8) from the viewpoint of the reading probe 33. When the frequency is equal to the natural frequency, the largest loss occurs and the reflection component is reduced. The reader 32 shown in FIG. 6 transmits the resonance frequency obtained by this measurement as frequency data information of the powder, and the positional information of the reading probe 33, to a computer 31. The computer 31 stores the frequency information. The computer 31, as the base data reader 201, also transmits the obtained frequency information to the host computer 101 through the network 300 by the transmitting section 205 contained in the base date reader 201.

Figure 6:
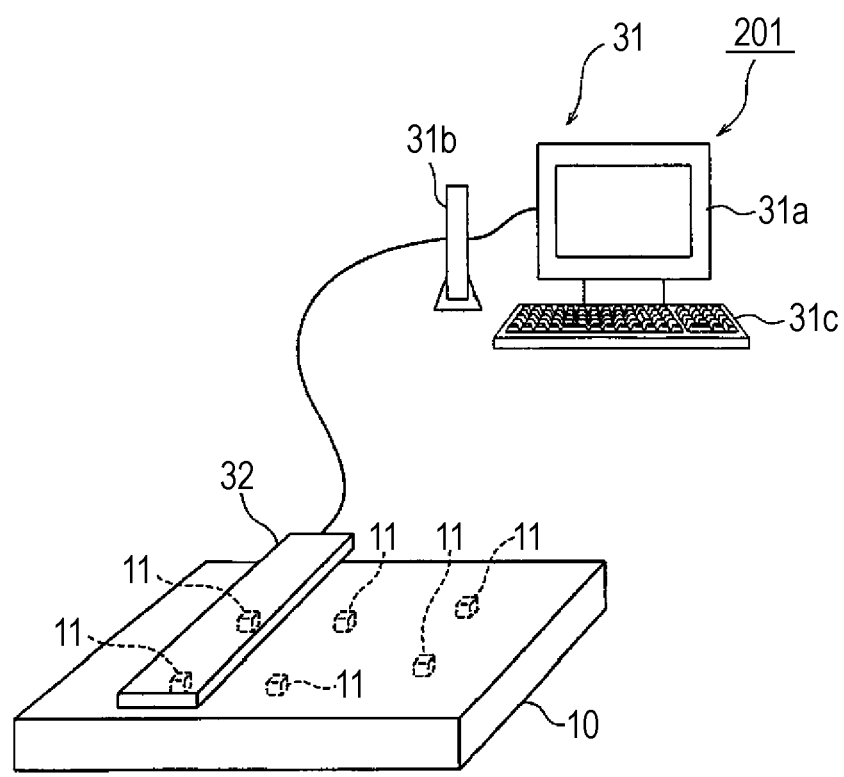
FIG. 6 is representation of a structure in which a base data reader receives signals from RF powder particles of an RF powder-containing base.

By scanning of the reader 32 over the entire surface of the base 10 shown in FIG. 6, the positional data and frequency data of each RF powder particle 11 which presents over the entire scanning region of the base 10 are stored in the memory of the computer 31 and transmitted to the host computer 101. The letter or figure written with the RF powder particles 11 may be read and stored, if necessary.

The RF powder particles 11 can be used for, for example, identifying counterfeit bills and certifying important documents by disposing the RF powder particles 11 on the surface of paper money, or by adding the RF powder particles 11 into important documents, such as public documents, or into important cards, such as licenses and insurance cards, according to the above method. In this instance, a plurality of or a large number of RF powder particles are collectively treated as a powder, but not as respective IC tag chips, and are accordingly easy to treat.

If the RF powder-containing base 10 is a paper money, it can be determined whether the paper money 10 is counterfeit, according to the information stored in advance in the host computer 101 and the information of the read computer 31. In addition, the host computer 101 can track the route of the circulation of the paper money 10 and compare the information with other data.

While the RF powder-containing base is described as a paper money in the present embodiment, it may be document paper, a name card, or a plastic card, such as a credit card. As long as, for example, a paper includes an RF power, even if nothing is written on the surface, an image can be displayed on a screen of a computer, according to the locations of RF powder particles and the frequency data of a high frequency electromagnetic field to which the RF powder particles respond, by reading the paper with a reader.

While a single type of RF powder particles 11 are used on or in a base 10 in the present embodiment, one or more types of RF powder particles may be used without being limited to the embodiment.

If a plurality of types of RF powder are used, RF powder particles have substantially the same structure as the above-described RF powder particle 11 and are designed so that the tank circuits thereof respond to high frequency electromagnetic fields having different frequencies.

INDUSTRIAL APPLICABILITY

The base data management system of the present invention can track the route of the circulation of paper money, credit cards, documents, and the like, and can be used to certify the traceability of paper money or the like to prevent counterfeit bills.

REFERENCE NUMERALS 10 base (paper money)
11, 21 RF powder particle
22 substrate
24 coil
25 capacitor
31 computer
32 reader
100 base data management system
101 host computer
102 data receiving section
103 storage section
104 output section
201 base data reader
202 base data reader
300 network

The invention claimed is:
1. A base data management system comprising:
a base data reader including a reading mechanism configured to read specific data of particles fixed to a base with a magnetic field coupling and a transmitting mechanism configured to transmit the specific data read by the reading mechanism and reader information, wherein the reading mechanism is configured to read the specific data by, at least in part, measuring an energy loss component, and wherein the energy loss component comprises a difference in energy transmitted from the base data reader and energy reflected by the particles fixed to the base and received at the base data reader; and
a computer including a data receiving mechanism configured to receive the specific data and the reader information transmitted from the base data reader through a network, a storage device configured to store the specific data and reader information received by the data receiv- ing mechanism, and an output mechanism configured to process the data stored in the storage device and output the data.

2. The base data management system according to claim 1, wherein the base includes an RF powder, and the RF powder includes RF powder particles, each having an antenna circuit element responding to an external high frequency electromagnetic field.

3. The base data management system according to claim 2, wherein the specific data is frequency data given by the antenna circuit elements of the RF powder particles.

4. The base data management system according to claim 1, wherein the base comprises paper or a plastic.

5. The base data management system according to claim 4, wherein the base is paper money or securities.

6. The base data management system according to claim 1, wherein the reader information includes an identification of the base data reader and read date and time information that indicates date and time information at which the specific data of the particles is read by the base data reader.

7. The base data management system according to claim 1, wherein the reader information includes information indicating a location of the base data reader.

8. A method comprising:
reading, by a reading device, specific data of particles fixed to a base with a magnetic field coupling, wherein the reading comprises measuring an energy loss component, and wherein the energy loss component comprises a difference in energy transmitted from the reading device and energy reflected by the particles fixed to the base and received at the reading device;
transmitting reader information and the specific data read by the reading device to a computing device, wherein the computing device is configured to receive the reader information and the specific data through a network, and process the received specific data and reader information.

9. The method according to claim 8, wherein the base includes an RF powder comprising RF powder particles, each having an antenna circuit element responding to an external high frequency electromagnetic field.

10. The method according to claim 9, wherein the specific data is frequency data given by the antenna circuit elements of the RF powder particles.

11. The method according to claim 8, wherein the base comprises paper or a plastic.

12. The method according to claim 11, wherein the base is paper money or securities.

13. The method according to claim 8, wherein the reader information includes an identification of the reading device and read date and time information that indicates date and time information at which the specific data of the particles is read by the reading device.

14. The method according to claim 8, wherein the reader information includes information indicating a location of the reading device.

* * * * *

UNITED STATES PATENT AND TRADEMARK OFFICE
CERTIFICATE OF CORRECTION

PATENT NO. : 8,766,802 B2
APPLICATION NO. : 12/516500
DATED : July 1, 2014
INVENTOR(S) : Yuji Furumura et al.

It is certified that error appears in the above-identified patent and that said Letters Patent is hereby corrected as shown below:

On the Title Page, in Column 1, Item (75), under "Inventors", on Line 2, delete "Tokyo (JP);" and insert -- Chiyoda, Tokyo (JP); --, therefor.

Signed and Sealed this
Sixteenth Day of September, 2014

Michelle K. Lee
*Deputy Director of the United States Patent and Trademark Office*